United States Patent

[11] 3,565,446

[72] Inventor Carl Erik Josef Nyberg
  Sylvens vag. 6, Skovde, Sweden
[21] Appl. No. 735,501
[22] Filed June 5, 1968
[45] Patented Feb. 23, 1971
[32] Priority June 9, 1967
[33] Sweden
[31] 8161/67

[54] FLUID PRESSURE SEAL ARRANGEMENT
  12 Claims, 8 Drawing Figs.
[52] U.S. Cl.................................................... 277/59,
  277/70, 277/176, 277/188, 92/182, 285/106
[51] Int. Cl....................................................... F16j 15/00,
  B65d 53/00, F16l 19/00
[50] Field of Search........................................... 277/59, 70,
  71, 176, 72, 188, 75, 79, 102, 177; 92/182, 250,
  251, 252; 285/(Inquired), 106, 107, 109, 277, 316

[56] References Cited
  UNITED STATES PATENTS
  896,947  8/1908  Stallman........................ 92/182

| 2,424,225 | 7/1947 | Dick................................ | 277/102X |
| 2,800,376 | 7/1957 | Traupmann et al.......... | 92/250X |
| 2,819,064 | 1/1958 | Peras............................. | 277/70X |
| 3,339,834 | 9/1967 | Palmer......................... | 277/79UX |

Primary Examiner—Samuel B. Rothberg
Attorney—Bauer & Goodman

ABSTRACT: A piston seal arrangement between a cylinder wall and a seal sleeve displaceably arranged in the cylinder, at the one end of which seal sleeve is arranged a seal ring made of elastic material and abutting the end of the sleeve and the cylinder, the seal ring being held in abutment with the end of the sleeve by means of an inner sleeve inserted in the seal sleeve and extending beyond the end of said seal sleeve and engaging around the seal ring, a gap being located between the seal sleeve and the inner sleeve which gap communicates with a pressure fluid chamber surrounded by the inner sleeve, and the seal sleeve being of such material and has such wall thickness that when a predetermined, relatively high pressure of said fluid is exceeded the seal sleeve expands radially into abutment with the cylinder wall under the influence of the pressure fluid in the chamber between the seal sleeve and the inner sleeve.

PATENTED FEB 23 1971 3,565,446
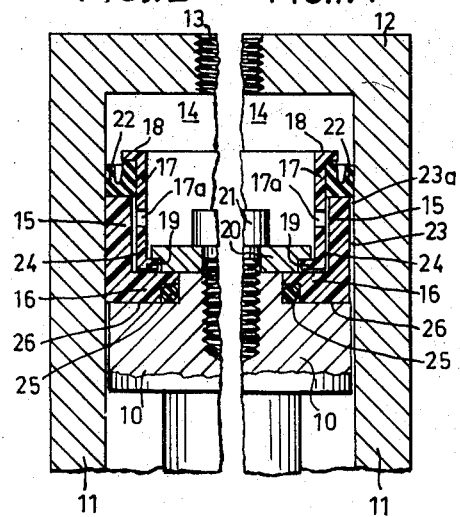
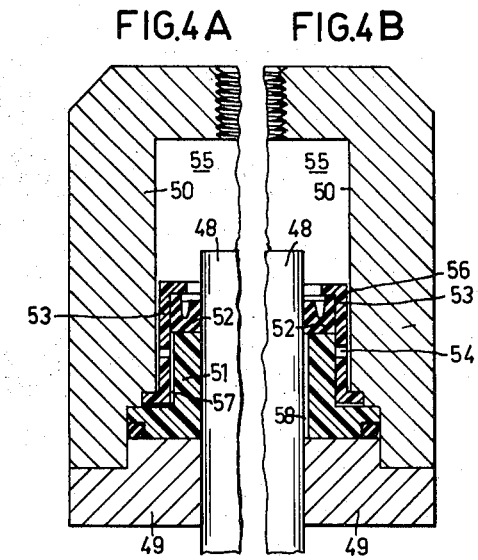
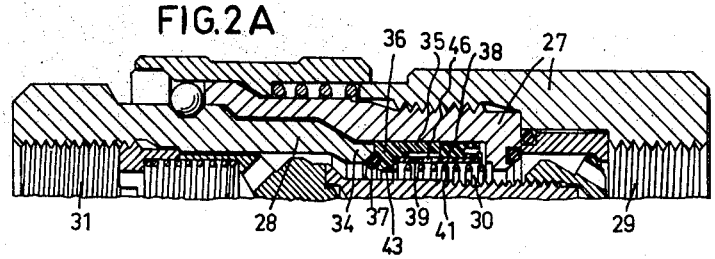
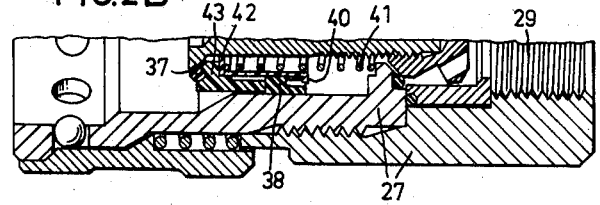
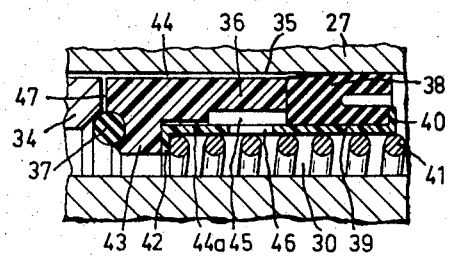
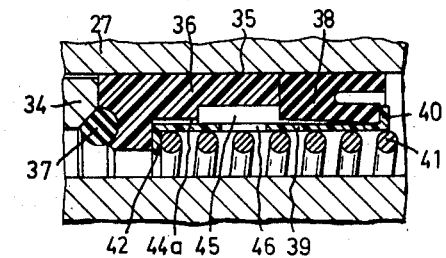
INVENTOR.
Carl Erik Josef Nyberg
BY
Greer Maréchal Jr.

FLUID PRESSURE SEAL ARRANGEMENT

The present invention is concerned with a piston seal arrangement between a cylinder wall and a seal sleeve displaceably arranged in said cylinder; there being arranged at the one end of said sleeve a seal ring, made of an elastic material and in abutment with the end of the sleeve and the cylinder wall; the seal ring being held in abutment with the end of said sleeve by means of an internal sleeve inserted in the seal sleeve and projecting from the end thereof to engage around the seal ring.

The object of the present invention is to improve, by simple means, the known piston seal arrangement so that it seals satisfactorily at fluid passages in the order of 200 kg./cm.$^2$ or more without risk of damage to the seal ring to enable the same to be used at pressures in the proximity of 800 kg./cm.$^2$, or even higher.

Seal arrangements of the type intended here are used, inter alia, in hose couplings, which comprise a nipple and a sleeve. Arranged within the sleeve is a cylindrical bore or tube, in which the respective seal sleeve and seal ring are arranged. If, for instance, the pressure medium is oil, the oil will press the seal ring into abutment with the end of the seal sleeve and with the cylinder wall. Located between the sleeve and the cylinder is a gap, which in the case of a hose coupling is normally about 0.1 mm. wide. This arrangement will function relatively satisfactorily at pressures below 100 kg./cm.$^2$, but as soon as the pressure is increased to several hundred kg. per cm.$^2$ the risk that the elastic seal ring will be pressed partially into the gap between the seal sleeve and the cylinder becomes greater. At sufficiently high pressures it is quite possible that the ring will be pressed completely into the gap. Penetration of the seal ring into the gap in this way naturally damages the ring, so that it no longer functions satisfactorily. The most obvious solution to the problem is to make the gap as small as possible, but for reasons of manufacture and because the sleeve must be capable of being displaced the gap cannot, in practice, be made less than 0.1 mm.

The aforementioned problem is now solved by means of the present invention in that a gap is provided between the seal sleeve and the cylinder, which varies with the pressure of the pressure fluid. For this purpose the seal arrangement according to the invention is mainly characterized in that located between the seal sleeve and the inner sleeve is a gap which communicates with the pressure fluid chamber surrounding said inner sleeve, and that the seal sleeve is made of such material and is of such thickness that when a predetermined, relatively high pressure of said fluid is exceeded it expands radially, under the influence of the pressure fluid present in the space between the seal sleeve and the inner sleeve, into abutment with the cylinder wall. In the practical embodiment of the invention the seal sleeve is made of plastic material, e.g. an acetal plastic (Delrin) having an elasticity which is greater than the elasticity of the metal walls of the cylinder. The modulus of elasticity of the seal sleeve in question suitably lies in the region of 3.000—50.000 kg./cm.$^2$. The seal ring may be of conventional design, in the form of a ring presenting cylindrical cross section of a so-called collar seal ring made of synthetic rubber. The hardness and elasticity of the seal ring are measured in Shore units, and suitably lie within the range of 50—100° Shore, preferably at a value of about 90° Shore. The gap located between the seal sleeve and the cylinder wall is suitably about 0.1 mm. If a greater clearance is used the seal sleeve must naturally be designed so that it expands more easily under the influence of the fluid pressure. For this purpose the seal sleeve may be made of a more elastic material and/or its wall thickness may be reduced.

A factor equally as important as obtaining a satisfactory seal in the hose couplings is to provide a satisfactory seal at those positions where the pressure of the fluid is created and where the fluid pressure is to be converted into work. These positions are usually occupied by a working piston or plunger, capable of moving in a pressure cylinder. A seal arrangement according to the invention can be used to advantage to seal the piston against the working cylinder.

These and further distinguishing features of the invention and advantages presented thereby are presented more specifically in the following description of a number of preferred embodiments and applications of the seal arrangement according to the invention.

FIG. 1A and FIG. 1B are sections taken through one and the same working cylinder having a working piston arranged therein and provided with a seal arrangement according to the invention; the seal in FIG. 1A being in an unloaded state and in FIG. 1B in a loaded state. FIGS. 2A and 2B show sections taken through a pressure liquid coupling, comprising a nipple and a sleeve; the nipple in FIG. 2A being inserted in the sleeve and sealed by means of a seal arrangement according to the invention, whereas FIG. 2B shows the sleeve after removal of the nipple. FIGS. 3A and 3B show the seal arrangements in FIGS. 2A and 2B in enlarged scale; the seal arrangements in FIG. 3A being in an unloaded state, while the seal arrangement in FIG. 3B is under the load exerted by pressure fluid.

FIGS. 4A and 4B show the seal arrangement according to the invention used to seal a plunger which extends through a guide structure in one end wall of a pressure cylinder and into the cylinder space, for providing pressure therein.

The principles of the invention will be more easily understood from FIGS. 1A and 1B. Shown in these FIGS. is a piston 10 which is capable of being displaced in a cylinder 11. Located in one end wall 12 of the cylinder is a hole 13 through which pressure oil can flow in and out. The working chamber of the cylinder is identified by the reference numeral 14.

Arranged at the end of the piston 10 is a cylindrical seal sleeve 15, which is provided at the end facing the piston 10 with an inwardly directed flange 16. Inserted within the seal sleeve 15 is an internal sleeve 17 which presents at its outer end a radially outwardly directed flange 18, and at its inner end a radially inwardly directed flange 19, which abuts the flange 16 of the seal sleeve and holds it in position by means of a plate 20. The sleeve 17 also presents radial holes 17a. The plate 20 is secured against the end of the piston 10 by means of a screw 21. Inserted between the outer end of the seal sleeve 15 and the flange 18 of the sleeve 17 is a collar seal ring 22 made of an elastic material.

The cylinder 11 is made of metal and the seal sleeve 15 is made of an elastic plastic material, e.g. an acetal plastic having a modulus of elasticity of about 28.000 kg./cm.$^2$ at 22° C. The seal ring 22 is of synthetic rubber presenting a hardness of 90° Shore. The inner sleeve 17 may be made of either metal or plastic material.

As can be seen from FIG. 1A a gap 23 is located between the seal sleeve 15 and the cylinder wall 11 when there is no pressure in the chamber 14 or when the pressure of the fluid is relatively low.

As soon as the pressure in the working chamber 14 has risen to some 100 kg./cm.$^2$, or to even higher values, the pressure will in the illustrated embodiment, propagate through the holes 17a in the inner sleeve 17 and pass to the gap 24 between the seal sleeve 15 and the inner sleeve 17, to actuate the seal sleeve 15 radially outwardly. Because of its elasticity the seal sleeve 15 expands and is caused to abut the cylinder wall, causing the gap 23 to disappear completely. Hence, the possibility of the sealing ring 22 penetrating the end 23a of the gap 23 adjacent the seal ring is also removed.

A seal ring 25 is provided for sealing the other end of the seal sleeve 15, said ring 25 being arranged between the flange 16 and the end of the piston 10, as shown in FIGS. 1A and 1B. The seal ring 25 rests on a smaller diameter than the seal ring 22, and thus the pressure in the working chamber 14 actuates the seal sleeve 15 axially, towards the piston, thereby causing the seal ring 25 to be compressed. In this way pressure oil is prevented from leaking out between the piston 10 and the cylinder wall 11 at the mutually abutting planar surfaces, at 26.

Shown in FIGS. 2A and 2B is a coupling sleeve 27, in which a nipple 28 is sealingly insertable for connecting together the ends of two hoses or pipes. The coupling as such is of known design and need not therefore be described in detail. In the coupled position shown in FIG. 2A pressure oil is present in the passages 29, 30, 31. The end 34 of the nipple 28 is inserted in a cylindrical bore 35 in the sleeve 27, and can be urged into sealing abutment with the end of a seal sleeve 36, while compressing an intermediate seal ring 37. The seal sleeve 36 is capable of being displaced in the cylindrical bore 35. Situated at the other end of the sleeve 36 is a collar seal ring 38 which seals against the cylinder wall 35 and against the end of the sleeve 36. Inserted in the seal sleeve 36 is an inner sleeve 39 which holds the ring 38 in position by means of a radially outwardly directed flange 40. Similarly, the sleeve 39 is held by a coil spring 41 in abutment with a flange 42, against the flange 43 of the sleeve 36.

The component parts of the sleeve 27 are made of metal while the seal sleeve is made of an elastic acetal plastic material presenting the same properties as the sleeve 15 in FIGS. 1A and 1B. When there is very little or no pressure in the flow passages 29, 30, 31 the seal sleeve 36 adopts the position shown in FIG. 3A. It will be seen from this FIG. that a gap 44 is present between the cylinder wall 35 and the seal sleeve 36. Located between the sleeve 36 and the inner sleeve 39 is a gap 44a which centers the inner sleeve and which widens along a portion of its length into a chamber 45. The chamber and the gap 44a communicate with the passage 30 through radial holes 46 in the inner sleeve.

As can be seen from FIGS. 3A and 3B the ends 34 and 43 of the nipple 28 and the sleeve 27, respectively, are flat, and positioned so that, because of the seal ring 37, they present a small clearance 47 therebetween when the coupling is not subjected to pressure, as shown in FIG. 3A. When pressure fluid is allowed to flow through the coupling and a certain pressure is reached the said ends pass into sealing abutment with each other so that the clearance 47 is reduced to zero. The seal ring has thereby been compressed, as can be seen from FIG. 3B. The seal ring 37 has a smaller diameter than the seal ring 38, and consequently the sleeve 36 is actuated in an axial direction by the fluid pressure, simultaneously as the sleeve 36 has expanded into sealing abutment with the cylinder walls 35, as in FIG. 3B, thereby to prevent the elastic sealing ring 38 from creeping in between the cylinder wall 35 and the seal sleeve 36.

FIGS. 4A and 4B illustrate another embodiment of the invention, in which a plunger 48 is inserted through the one end wall 49 of a cylinder 50 and is guided in a sleeve 51. This sleeve forms a seal sleeve according to the invention, and is thus made of an elastic material, such as a plastic material presenting the aforementioned characteristics. The end of the sleeve 51 is provided with a seal ring 52 of the same design as shown in FIGS. 3A and 3B. Positioned around the seal ring 52 in the sleeve 51 is a sleeve 53 which corresponds to the inner sleeve 39 in FIGS. 3A and 3B. Thus, the difference in this instance is merely that the sleeve 53 is positioned on the outside of the seal sleeve 51. The sleeve 53 is also provided with through-flow holes 54, to allow pressure fluid from the working chamber 55, to flow via the gap 56 between the sleeve 53 and the cylinder 50 to the gap 57 between the sleeve 53 and the seal sleeve 51, so that the pressure fluid is able to compress the sleeve 51 into abutment with the plunger 48. In FIG. 4B the sleeve 51 is shown in an unbiased state, having a normal gap 58 between the plunger 48 and the sleeve 51. In FIG. 4A the pressure is so high in the working chamber 55 that the pressure fluid passed to the gap 57 between the sleeves 53 and 51 compresses the sleeve 51 into abutment with the plunger 48, to prevent the seal ring 52 entering between the sleeve 51 and the plunger 48.

I claim:

1. A seal arrangement establishing a sliding seal with a member having a cylindrical wall exposed to a fluid under pressure comprising a seal sleeve displaceably arranged adjacent said cylindrical wall, a seal ring made of elastic material and abutting an end of said seal sleeve and said cylindrical wall, and a retaining sleeve disposed alongside said seal sleeve at the side thereof away from the wall and extending beyond the said end of said seal sleeve and engaging said seal ring to hold said seal ring in abutment with the end of said seal sleeve, said retaining sleeve being spaced from said seal sleeve to provide a radial gap, a pressure fluid chamber, and a passage from said gap to said pressure fluid chamber, said seal sleeve being composed of an elastic material and having a wall thickness such that when a predetermined, relatively high pressure of said fluid is exceeded, said seal sleeve is elastically deformed radially into abutment with said cylindrical wall by the pressure of the fluid present in the gap.

2. The seal arrangement according to claim 1, wherein said seal ring is made of rubber, said seal sleeve is made of a plastics material having a lower elasticity than the material from which the seal ring is made, and said cylindrical wall is made of metal having a lower elasticity than the material from which the seal sleeve is made.

3. The seal arrangement according to claim 1, wherein said passage is at least one hole through the wall of said retaining sleeve.

4. The seal arrangement according to claim 2, wherein the end of said seal sleeve remote from said seal ring is provided with a flange directed radially away from said cylindrical wall, the inside of which flange abuts the retaining sleeve and forms a stop member for restricting axial displacement of said retaining sleeve in the direction for urging said seal ring into abutment with said seal sleeve, and the outside of which is disposed in sealing engagement with a cylindrical portion having a cylindrical surface disposed alongside said cylindrical wall, and being displaceable with respect thereto, said sealing engagement being effected by means of a second elastic seal ring spaced apart from said cylindrical wall, whereby said seal sleeve, owing to the difference in radii of said seal rings, is actuated by the fluid under pressure in a direction towards the cylindrical portion to compress said second seal ring.

5. The seal arrangement according to claim 4, wherein the end of said retaining sleeve which abuts said flange of said seal sleeve is provided with a flange directed radially away from said cylindrical wall, which flange forms a support member for a member which holds the retaining sleeve in position within the seal sleeve.

6. The seal arrangement according to claim 5, wherein said member which holds said retaining sleeve in position within the seal sleeve comprises a compression spring abutting said flange of said retaining sleeve.

7. The seal arrangement according to claim 4, wherein the radial gap between said seal sleeve and said retaining sleeve comprises two portions axially disposed one behind the other, of which the one is substantially shorter than the other and forms a centered gap which terminates at the flange of said seal sleeve, and of which the second and longer portion forms an annular groove which terminates at the end of said seal sleeve abutting said seal ring and has a radial width which is several times greater than the width of the first mentioned portion.

8. The seal arrangement according to claim 7, wherein said retaining sleeve has a cylindrical surface disposed alongside said seal sleeve, and said seal sleeve has an annular recess therein at the side thereof which is disposed alongside said retaining sleeve, said recess having an axial length greater than the remaining part of said side which is disposed alongside said retaining sleeve and which forms the centering portion for said retaining sleeve.

9. The seal arrangement according to claim 4, wherein the said seal ring abutting the end of said seal sleeve is a collar seal having a U-shaped cross section, the leg portions of which are directed away from said seal sleeve.

10. The seal arrangement according to claim 9, wherein said seal sleeve is arranged in a coupling sleeve intended for receiving a coupling nipple, to form a high pressure coupling.

11. The seal arrangement according to claim 1, wherein said seal sleeve forms an extension at the end of a pressure piston which is displaceable within the cylindrical wall of a cylinder for the pressure fluid.

12. The seal arrangement according to claim 1, wherein said seal sleeve forms a guide structure for the cylindrical wall of a cylindrical plunger or piston rod passed therethrough, and against which said seal ring abutting against the end of said seal sleeve seals.